US010771929B2

(12) United States Patent
Byun et al.

(10) Patent No.: US 10,771,929 B2
(45) Date of Patent: Sep. 8, 2020

(54) METHOD AND APPARATUS FOR PERFORMING V2X COMMUNICATION ON BASIS OF CELL GROUP INFORMATION

(71) Applicant: LG ELECTRONICS INC., Seoul (KR)

(72) Inventors: Daewook Byun, Seoul (KR); Jian Xu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 138 days.

(21) Appl. No.: 16/085,952

(22) PCT Filed: Mar. 20, 2017

(86) PCT No.: PCT/KR2017/002977
§ 371 (c)(1),
(2) Date: Sep. 17, 2018

(87) PCT Pub. No.: WO2017/160134
PCT Pub. Date: Sep. 21, 2017

(65) Prior Publication Data
US 2019/0090098 A1  Mar. 21, 2019

Related U.S. Application Data

(60) Provisional application No. 62/310,016, filed on Mar. 18, 2016, provisional application No. 62/336,512, filed on May 13, 2016.

(51) Int. Cl.
*H04W 4/06* (2009.01)
*H04W 76/14* (2018.01)
(Continued)

(52) U.S. Cl.
CPC ............. *H04W 4/06* (2013.01); *H04L 12/189* (2013.01); *H04W 4/40* (2018.02); *H04W 72/005* (2013.01);
(Continued)

(58) Field of Classification Search
CPC ....... H04W 4/06; H04W 76/14; H04W 76/00; H04W 76/40; H04W 4/40; H04W 72/005; H04W 72/1236; H04L 12/189
See application file for complete search history.

(56) References Cited

U.S. PATENT DOCUMENTS

2010/0254352 A1* 10/2010 Wang ................ H04W 36/0007
370/332
2011/0141963 A1    6/2011 Lim
(Continued)

FOREIGN PATENT DOCUMENTS

WO    2015102334    7/2015

OTHER PUBLICATIONS

WO2017143891, "Method and Device for Establishing Vehicle-To-Everything Session Request and Determining Transmission Cell", Aug. 31, 2017, (Year: 2017).*
(Continued)

*Primary Examiner* — Habte Mered
(74) *Attorney, Agent, or Firm* — Lee Hong Degerman Kang Waimey

(57) ABSTRACT

Provided are a method for performing, by a multi-cell coordination entity (MCE), a vehicle-to-everything (V2X) communication in a wireless communication system, and an apparatus for supporting the same. The method comprises the steps of: receiving, from an MME, information on a cell group and an indication which instructs the MCE to perform either of a multicast broadcast single frequency network (MBSFN) operation or a single-cell point-to-multipoint
(Continued)

(SCPTM) operation; determining to perform either of the MBSFN operation or the SCPTM operation on the basis of the indication; and transmitting, to a base station, the information on the cell group received from the MME, on the basis of the information on the cell group and the determined operation, wherein the information on the cell group may be information related to a cell group to which a V2X message is to be delivered, and the base station may be a base station that manages cells which belong to the cell group to which the V2X message is to be delivered.

12 Claims, 14 Drawing Sheets

(51) Int. Cl.
    *H04W 76/00*   (2018.01)
    *H04W 4/40*    (2018.01)
    *H04L 12/18*   (2006.01)
    *H04W 72/00*   (2009.01)
    *H04W 72/12*   (2009.01)
(52) U.S. Cl.
    CPC ....... *H04W 72/1236* (2013.01); *H04W 76/00* (2013.01); *H04W 76/14* (2018.02)

(56) References Cited

U.S. PATENT DOCUMENTS

| | | | |
|---|---|---|---|
| 2015/0119023 A1* | 4/2015 | Wang | H04W 72/005 |
| | | | 455/432.1 |
| 2015/0223030 A1* | 8/2015 | Gu | H04W 4/08 |
| | | | 370/312 |
| 2015/0358940 A1 | 12/2015 | Zhang et al. | |
| 2017/0041752 A1* | 2/2017 | Baek | H04W 76/14 |
| 2018/0103356 A1* | 4/2018 | Wang | H04W 4/023 |
| 2018/0324560 A1* | 11/2018 | Xu | H04W 4/06 |

OTHER PUBLICATIONS

PCT International Application No. PCT/KR2017/002977, International Search Report dated Jun. 20, 2017, 4 pages.
3rd Generation Partnership Project; Technical Specification Group Services and System Aspects; Study on architecture enhancements for LTE support of V2X services (Release 14), 3GPP TR 23.785 V0.2.0, Feb. 2016, 21 Pages.

* cited by examiner

METHOD AND APPARATUS FOR PERFORMING V2X COMMUNICATION ON BASIS OF CELL GROUP INFORMATION

CROSS-REFERENCE TO RELATED APPLICATIONS

This application is the National Stage filing under 35 U.S.C. 371 of International Application No. PCT/KR2017/002977, filed on Mar. 20, 2017, which claims the benefit of U.S. Provisional Applications No. 62/310,016, filed on Mar. 18, 2016 and 62/336,512, filed on May 13, 2016, the contents of which are all hereby incorporated by reference herein in their entirety.

BACKGROUND OF THE INVENTION

Field of the Invention

The present invention relates to a wireless communication system and, more particularly, to a method of performing vehicle-to-everything (V2X) communication based on information on a cell group and a device supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

In recent years, there is growing interest in a Device-to-Device (D2D) technology performing direct communication between devices. In particular, the D2D is attracting attention as a communication technology for a public safety network. A commercial communication network has been rapidly changed to the LTE but a current public safety network is on the basis of a 2G technology in a collision problem and a cost side with an existing communication standard. Request for the technology clearance and an improved service induces an effort to improve the public safety network.

The public safety network has high service requirements (reliability and security) as compared with a commercial communication network. In particular, when coverage of cellular communication is insufficient or is not used, there is a need for direct signal transmission/reception between devices, that is, a D2D operation.

The D2D operation may be signal transmission/reception between adjacent devices to have various advantages. For example, a D2D UE may perform data communication with a high transmission rate and low delay. Further, the D2D operation may distribute traffic converged in a base station. If the D2D UE serves as a relay, the D2D UE may serve to extend coverage of a base station.

Vehicle to everything (V2X) is a technology that combines mobility to a D2D technology to enable vehicles to continuously communicate with a road infrastructure or other vehicles, while driving, to exchange useful information such as traffic conditions, and the like.

SUMMARY OF THE INVENTION

Meanwhile, in order to broadcast a V2X message, a cell group may be set. When a cell group is set, a V2X message generated in a certain cell belonging to the cell group may be broadcast to all the cells that belong to the cell group. Also, an eMBMS system may be used to broadcast a V2X message generated in a certain cell belonging to a cell group to all the cells that belong to the cell group. However, currently, there is no way for an MBMS related node (for example, MCE, MME, BM-SC, etc.) to know the cell group. If the MBMS related node does not know the information related to the cell group, the V2X message may be transmitted to a cell to which the V2X message is not required to be transmitted, and thus, signaling between the MBMS related nodes and radio resources for transmitting the V2X message may be unnecessary. Therefore, a method of performing V2X communication based on the cell group information and a device supporting the same need to be proposed.

In an aspect, a method for performing vehicle-to-everything (V2X) communication by a multi-cell coordination entity (MCE) in a wireless communication system is provided. The method includes receiving information on a cell group and an indication indicating the MCE to perform either a multicast broadcast single frequency network (MBSFN) operation or a single-cell point-to-multipoint (SCPTM) operation from an mobility management entity (MME); determining to perform either the MBSFN operation or the SCPTM operation based on the indication; and transmitting the information on the cell group received from the MME to a base station (BS) based on the information on the cell group and the determined operation, wherein the information on the cell group is information related to a cell group to which a V2X message is to be transferred, and the BS is a BS that manages a cell belonging to the cell group to which the V2X message is to be transferred.

The method may further include: when the MCE determines to perform the SCPTM operation, transmitting a QoS parameter for an MBMS bearer to the BS. The information related to the cell group may include at least any one of an index of a cell group, a list of cell IDs, and an MBMS service area.

The method may further include: when the MCE determines to perform the MBSFN operation, transmitting an MBMS scheduling information message including the information on the cell group to the BS.

In another aspect, a method for performing vehicle-to-everything (V2X) communication by a multi-cell coordination entity (MCE) in a wireless communication system is provided. The method includes: receiving information on a cell group from a first base station (BS); transmitting the information on the cell group received from the first BS to a mobility management entity (MME); receiving an MBMS session start request message including the information on the cell group from the MME; and transmitting the MBMS session start request message including the information on the cell group received from the MME to one or more second BSs based on the information on the cell group received from the MME, wherein the information on the cell group is information related to a cell group to which a V2X message generated in a cell managed by the first BS is to be transferred, and the second BS is a BS that manages a cell belonging to the cell group to which the V2X message generated in the cell managed by the first BS is to be transferred.

The information on the cell group may include an index of the cell group to which the V2X message generated in the cell managed by the first BS is to be transferred.

The information on the cell group may include a list of an ID of a cell to which the V2X message generated in the cell managed by the first BS is to be transferred.

The one or more second BSs may include the first BS.

The one or more second BSs may include the first BS and a neighbor BS of the first BS.

The information on the cell group received from the first BS may be included in an M2 setup request message and received from the first BS. The information on the cell group received from the first BS may be included in an eNB configuration update message and received from the first BS.

The information on the cell group transmitted to the MME may be included in an M3 setup request message and transmitted to the MME. The information on the cell group transmitted to the MME may be included in the MCE configuration update message and transmitted to the MME.

The method may further include: when the MBMS session start request message is accepted by the second BS, receiving an MBMS session start response message from the second BS. The method may further include: transmitting an MBMS session start response message including a requested result of an MBMS E-UTRAN radio access bearer (E-RAB) to the MME.

In another aspect, a method for performing vehicle-to-everything (V2X) communication by a multi-cell coordination entity (MCE) in a wireless communication system is provided. The method includes: receiving information on a cell group from a first base station (BS); transmitting the information on the cell group received from the first BS to a mobility management entity (MME); receiving an MBMS session update request message including the information on the cell group from the MME; and transmitting the MBMS session update request message including the information on the cell group received from the MME to one or more second BSs based on the information on the cell group received from the MME, wherein the information on the cell group is information related to a cell group to which a V2X message generated in a cell managed by the first BS is to be transferred, and the second BS is a BS that manages a cell belonging to the cell group to which the V2X message generated in the cell managed by the first BS is to be transferred.

The information on the cell group may include an index of the cell group to which the V2X message generated in the cell managed by the first BS is to be transferred.

The information on the cell group may include a list of an ID of a cell to which the V2X message generated in the cell managed by the first BS is to be transferred.

The one or more second BSs may include the first BS.

According to the present invention, a V2X message may be broadcast only to cells that belong to a specific cell group.

DESCRIPTION OF EXEMPLARY EMBODIMENTS

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA-2000. The TDMA may be implemented with a radio technology such as global system for mobile communications (GSM)/general packet ratio service (GPRS)/enhanced data rate for GSM evolution (EDGE). The OFDMA may be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
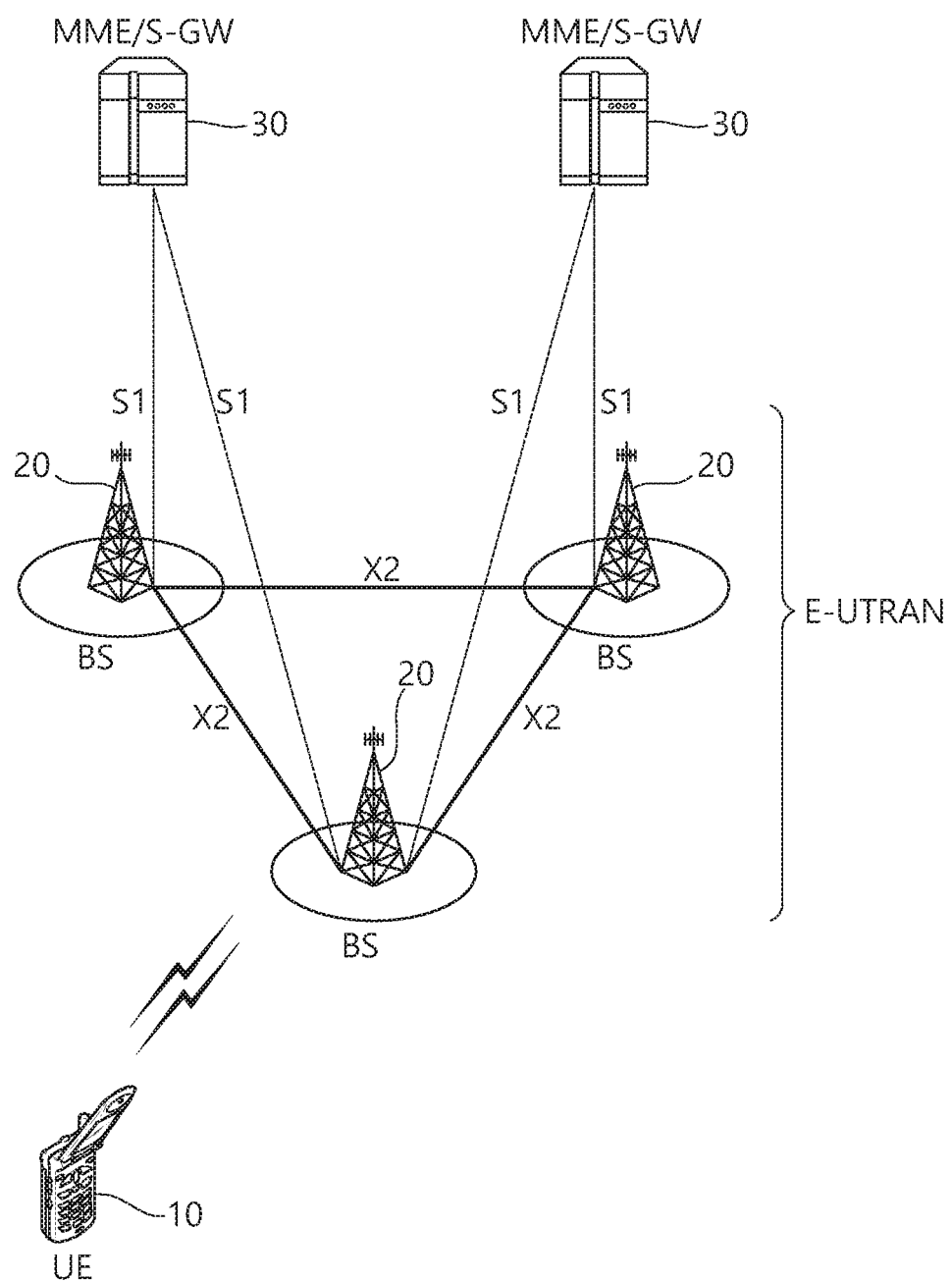
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells may be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighbor eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE IDLE state management, ciphering of the user plane, SAE bearer control, and ciphering and integrity protection of NAS signaling.

Figure 2:
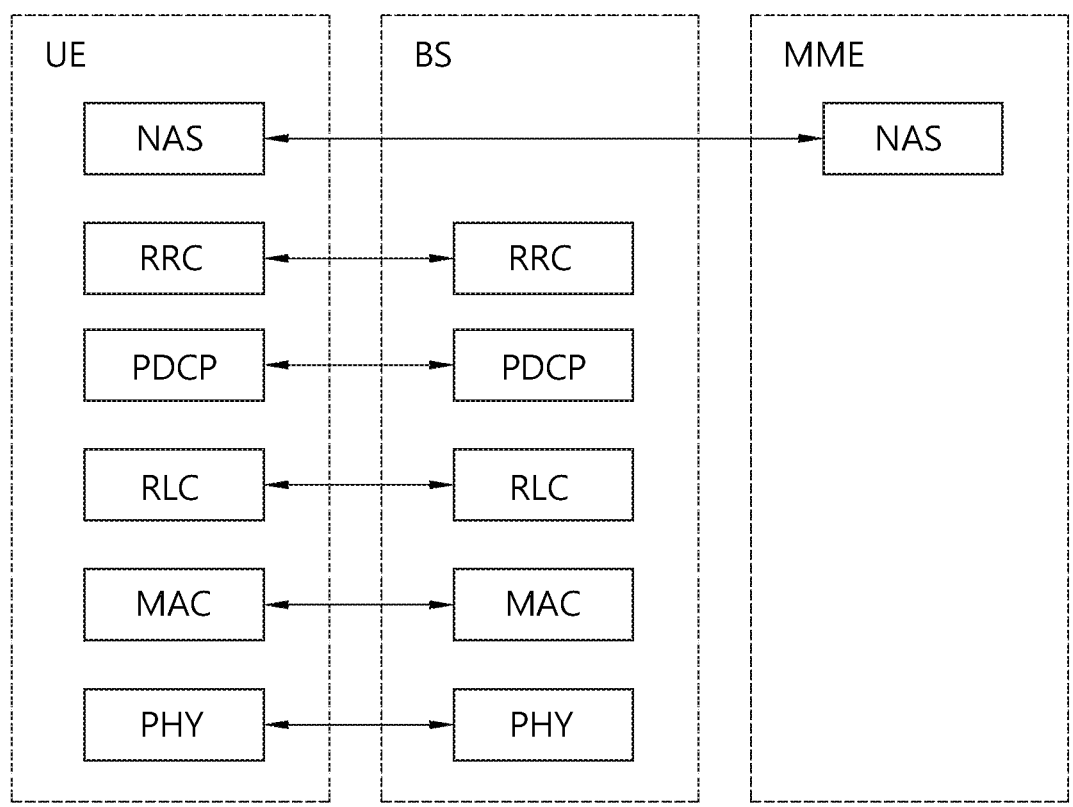
FIG. 2 shows a control plane of a radio interface protocol of an LTE system.

FIG. 2 shows a network architecture for a Multimedia Broadcast/Multicast Service (MBMS).

Referring to FIG. 2, the radio access network (EUTRAN) 200 includes a multi-cell coordination entity (hereinafter, "MCE") 210 and a base station (eNB) 220. The MCE 210 is a main entity for controlling the MBMS and plays a role to perform session management, radio resource allocation or admission control of the base station 220. The MCE 210 may be implemented in the base station 220 or may be implemented independent from the base station 220. The interface between the MCE 210 and the base station 220 is called M2 interface. The M2 interface is an internal control plane interface of the radio access network 200 and MBMS control information is transmitted through the M2 interface. In case the MCE 210 is implemented in the base station 220, the M2 interface may be present only logically.

The Evolved Packet Core (EPC) 250 includes an MME 260 and an MBMS gateway (GW) 270. The MBMS gateway 270 is an entity for transmitting MBMS service data and is positioned between the base station 220 and the BM-SC and performs MBMS packet transmission and broadcast to the base station 220. The MBMS gateway 270 uses a PDCP and IP multicast to transmit user data to the base station 220 and performs session control signaling for the radio access network 200.

The interface between the MME 260 and the MCE 210 is a control plane interface between the radio access network 200 and the EPC 250 and is called M3 interface. Control information related to MBMS session control is transmitted through the M3 interface. The MME 260 and the MCE 210 transmits, to the base station 220, session control signaling such as a session start/stop message for session start or session stop, and the base station 220 may inform the UE through a cell notification that the corresponding MBMS service has been started or stopped.

The interface between the base station 220 and the MBMS gateway 270 is a user plane interface and is called M1 interface.

Figure 3:
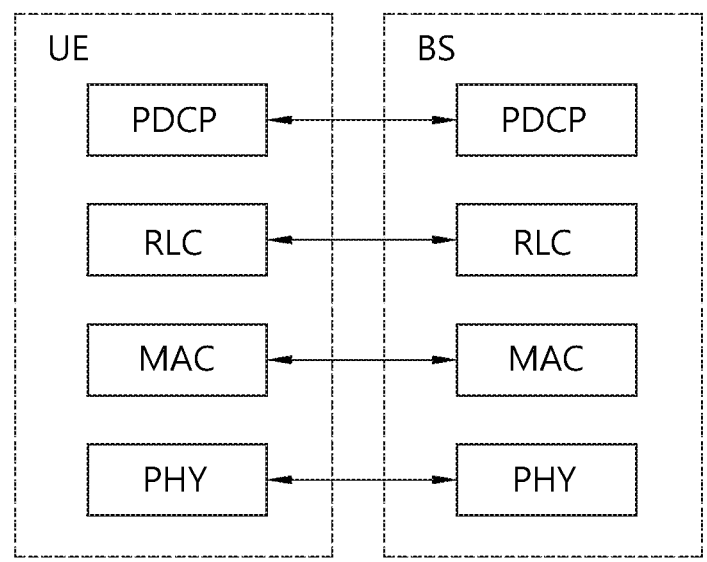
FIG. 3 shows a user plane of a radio interface protocol of an LTE system.

FIG. 3 shows a control plane and a user plane of a radio interface protocol of an LTE system. FIG. 3(a) shows a control plane of a radio interface protocol of an LTE system. FIG. 3(b) shows a user plane of a radio interface protocol of an LTE system.

Layers of a radio interface protocol between the UE and the E-UTRAN may be classified into a first layer (L1), a second layer (L2), and a third layer (L3) on the basis of the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indication channel (PCFICH) reports the number of OFDM symbols used for PDCCHs to the UE, and is transmitted in every subframe. A physical hybrid ARQ indication channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and may exist in both uplink and downlink. The MTCH is a point-to-multipoint downlink channel for transmitting traffic data from the network to the UE.

Uplink connections between logical channels and transport channels include the DCCH that may be mapped to the UL-SCH, the DTCH that may be mapped to the UL-SCH and the CCCH that may be mapped to the UL-SCH. Downlink connections between logical channels and transport channels include the BCCH that may be mapped to the BCH or DL-SCH, the PCCH that may be mapped to the PCH, the DCCH that may be mapped to the DL-SCH, and the DTCH that may be mapped to the DL-SCH, the MCCH that may be mapped to the MCH, and the MTCH that may be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, may be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 3(a), the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE IDLE mobility handling, paging origination in LTE IDLE, and security control for the signaling between the gateway and UE.

Referring to FIG. 3(b), the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC State of a UE and RRC Connection Procedure are Described.

An RRC state indicates whether an RRC layer of the UE is logically connected to an RRC layer of the E-UTRAN. The RRC state may be divided into two different states such as an RRC_connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE may report channel quality information and feedback information to the eNB. In RRC_CONNECTED state, the E-UTRAN knows the cell to which the UE belongs. Therefore, the network may transmit and/or receive data to/from UE, the network may control mobility (handover and inter-radio access technologies (RAT) cell change order to GSM EDGE radio access network (GERAN) with network assisted cell change (NACC)) of the UE, and the network may perform cell measurements for a neighbor cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, an MBMS and a Multicast/Broadcast Single Frequency Network (MBSFN) are Described.

MBSFN transmission or MBSFN-mode transmission refers to a simultaneous transmission scheme in which a plurality of cells transmits the same signal at the same time. MBSFN transmissions from a plurality of cells within an MBSFN area are perceived as a single transmission for a UE.

The MBMS service may be managed or localized in a cell-based or geography-based manner. An area in which a specific MBMS service is provided is widely referred to as an MBMS service area. For example, if an area in which a specific MBSMS service A proceeds is an MBMS service area A, a network in the MBMS service area A may be in a state of transmitting the MBMS service A. In this case, the UE may receive the MBMS service A according to a UE capability. The MBMS service area may be defined in terms of an application and a service as to whether a specific service is provided in a specific area.

A transport channel for the MBMS, that is, a multicast channel (MCH), may be mapped to a logical channel, e.g., a multicast control channel (MCCH) or a multicast traffic channel (MTCH). The MCCH transmits an MBMS-related RRC message, and the MTCH transmits a traffic of a specific MBMS service. One MCCH exists in every one MBMS single frequency network (MBSFN) region for transmitting the same MBMS information/traffic. The MCCH includes one MBSFN region configuration RRC message, and has a list of all MBMS services. If the MBMS-related RRC message is changed in a specific MCCH, a physical downlink control channel (PDCCH) transmits an MBMS radio network temporary identity (M-RNTI) and an indication for indicating the specific MCCH. The UE which supports the MBMS may receive the M-RNTI and the MCCH indication through the PDCCH, may recognize that the MBMS-related RRC message is changed in the specific MCCH, and may receive the specific MCCH. The RRC message of the MCCH may be changed in every modification period, and is broadcast repetitively in every repetition period. A notification mechanism is used to inform an MCCH change caused by a presence of an MCCH session start or MBMS counting request message. The UE detects the MCCH change informed without having to depend on the notification mechanism through MCCH monitoring in the modification period. The MTCH is a logical channel on which an MBMS service carried. If many services are provided in an MBSFN region, a plurality of MTCHs may be configured.

A UE may also be provided with a dedicated service while being provided with an MBMS service. For example, a user may chat on the user's own smartphone using an instant messaging (IM) service, such as MSN or Skype, simultaneously with watching a TV on the smartphone through an MBMS service. In this case, the MBMS service is provided through an MTCH received by a plurality of UEs at the same time, while a service provided for each individual UE, such as the IM service, is provided through a dedicated bearer, such as a dedicated control channel (DCCH) or dedicated traffic channel (DTCH).

In one area, a BS may use a plurality of frequencies at the same time. In this case, in order to efficiently use radio resources, a network may select one of the frequencies to provide an MBMS service only in the frequency and may provide a dedicated bearer for each UE in all frequencies. In this case, when a UE, which has been provided with a service using a dedicated bearer in a frequency where no MBMS service is provided, wishes to be provided with an MBMS service, the UE needs to be handed over to an MBMS providing frequency. To this end, the UE transmits an MBMS interest indication to a BS. That is, when the UE wishes to receive an MBMS service, the UE transmits an MBMS interest indication to the BS. When the BS receives the indication, the BS recognizes that the UE wishes to receive the MBMS service and hands the UE over to an MBMS providing frequency. Here, the MBMS interest indication is information indicating that the UE wishes to receive an MBMS service, which additionally includes information regarding a frequency to which the UE wishes to be handed over.

The UE, which wishes to receive a specific MBMS service, first identifies information regarding a frequency at which the specific service is provided and information regarding broadcast time at which the specific service is provided. When the MBMS service is already on air or is about to be on air, the UE assigns the highest priority to the frequency at which the MBMS service is provided. The UE performs a cell reselection procedure using reset frequency priority information and moves to a cell providing the MBMS service to receive the MBMS service.

When the UE is receiving an MBMS service or is interested in receiving an MBMS service and when the UE is allowed to receive an MBMS service while camping on an MBMS service-providing frequency, it may be considered that the frequency is assigned the highest priority during an MBMS session as long as the following situations last while the reselected cell is broadcasting SIB13.

When SIB15 of a serving cell indicates that one or more MBMS service area identities (SAIs) are included in the user service description (USD) of the service.

SIB15 is not broadcast in a serving cell, and the frequency is included in the USD of the service.

A UE needs to be able to receive an MBMS in RRC_IDLE and RRC_CONNECTED states.

Hereinafter, a D2D Operation Will be Described.

In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described. The ProSe includes ProSe direct communication and ProSe direct discovery.

The ProSe direct communication presents communication performed by two or more adjacent UEs. The UEs may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a UE which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable UEs are closed to each other, and reports the close state thereof the two ProSe enabled UEs. Hereinafter, the ProSe direct communication may refer to D2D communication, and the ProSe direct discovery may refer to D2D discovery.

Hereinafter, Radio Resource Assignment for ProSe Direct Communication Will be Described.

ProSe-enabled UE may use the following two types of mode for resource assignment for ProSe direct communication.

1) Mode 1: Mode 1 is mode in which resources for ProSe direct communication are scheduled by a base station. UE needs to be in the RRC_CONNECTED state in order to send data in accordance with mode 1. The UE requests a transmission resource from the base station. The base station performs scheduling assignment and schedules resources for sending data. The UE may send a scheduling request to the base station and send a ProSe Buffer Status Report (BSR). The base station has data to be subjected to ProSe direct communication by the UE on the basis of the ProSe BSR and determines that a resource for transmission is required.

2) Mode 2: Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with a base station or is placed in a specific cell in the RRC_IDLE state, the UE is considered to be placed within coverage of the base station. If UE is placed outside coverage, only mode 2 may be applied. If the UE is placed within the coverage, the UE may use mode 1 or mode 2 depending on the configuration of the base station. If another exception condition is not present, only when a base station performs a configuration, UE may change mode from mode 1 to mode 2 or from mode 2 to mode 1.

Figure 4:
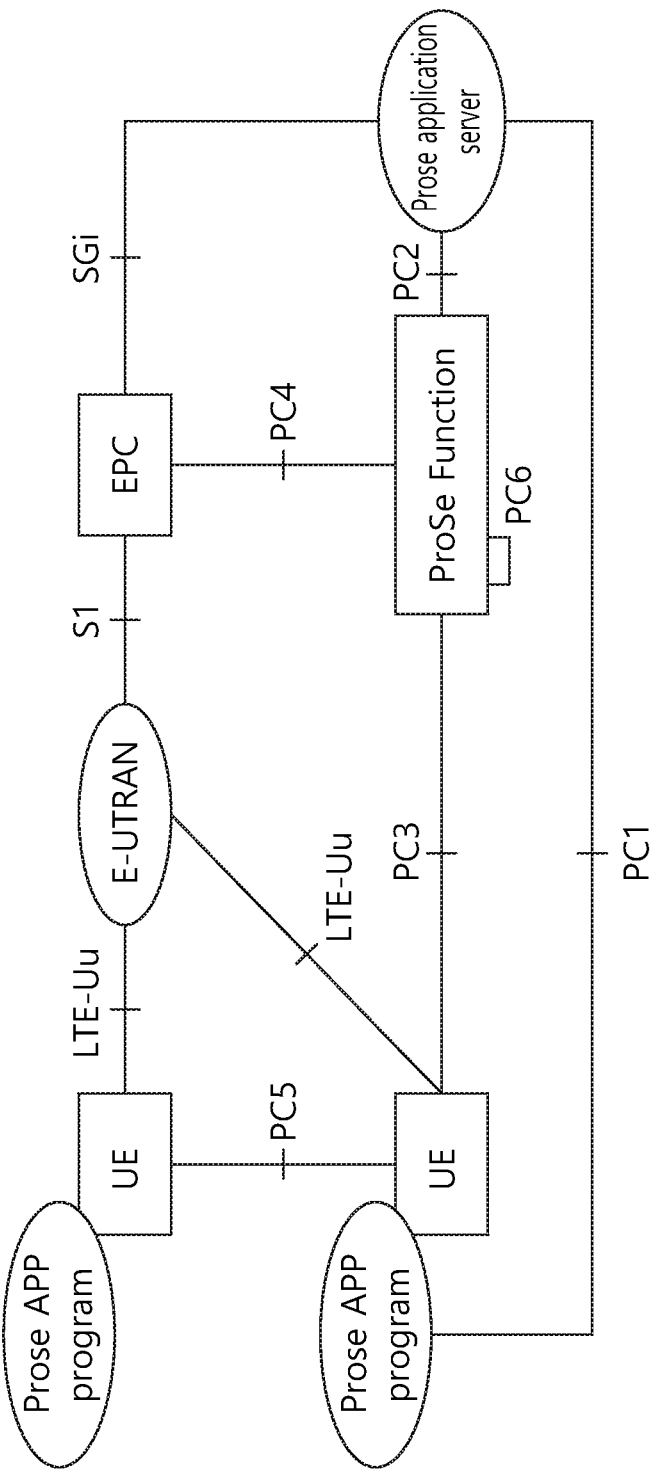
FIG. 4 shows a reference structure for a ProSe.

FIG. 4 shows a reference structure for a ProSe.

Referring to FIG. 4, the reference structure for a ProSe includes a plurality of UEs having E-UTRAN, EPC, and ProSe application program, a ProSe application (APP) server, and a ProSe function. An EPC is a representative example of the E-UTRAN. The EPC may include an MME, an S-GW, a P-GW, a policy and charging rules function (PCRF), and a home subscriber server (HSS). The ProSe application server is a user of ProSe in order to make an application function. The ProSe application server may communicate with an application program in the UE. The application program in the UE may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a Reference Point and a Reference Interface Will be Described in a Reference Structure for the ProSe.

PC1: a reference point between a ProSe application program in the UE and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the UE and the ProSe function. The PC3 is used to define an interaction between the UE and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between UEs, and 1:1 communication.

PC6: is a reference point to use a function such as ProSe discovery between users included in different PLMNs.

SGi: may be used for application data and application level control information exchange.

Hereinafter, ProSe Direct Communication (D2D Communication) is described.

The ProSe direct communication is a communication mode where two public safety UEs may perform direct communication through a PC5 interface. The communication mode may be supported in both of a case of receiving a service in coverage of E-UTRAN or a case of separating the coverage of E-UTRAN.

Hereinafter, Single-Cell Point-to-Multipoint (SCPTM) Transmission is Described.

A transmission method of an MBMS service includes SCPTM transmission and multimedia broadcast multicast service single frequency network (MBSFN) transmission. While identifiable signals are transmitted simultaneously in a plurality of cells in the MBSFN transmission, the MBMS service is transmitted in a single cell in the SCPTM transmission. Therefore, unlike in the MBSFN transmission, synchronization between cells is not necessary in the SCPTM transmission. Further, the SCPTM transmission directly uses the existing PDSCH, and thus has a unicast feature unlike in the MBSFN transmission. That is, a plurality of UEs read the same PDCCH, and acquire an RNTI for each service to receive an SCPTM service. An SCPTM-dedicated MCCH is introduced, and if it is determined that a service desired by the UE is an SCPTM service through the MCCH, the UE may acquire a corresponding RNTI value and read a PDCCH through a corresponding RNTI to receive the SCPTM service.

Hereinafter, Vehicle to Everything (V2X) Communication is Described.

Figure 5:
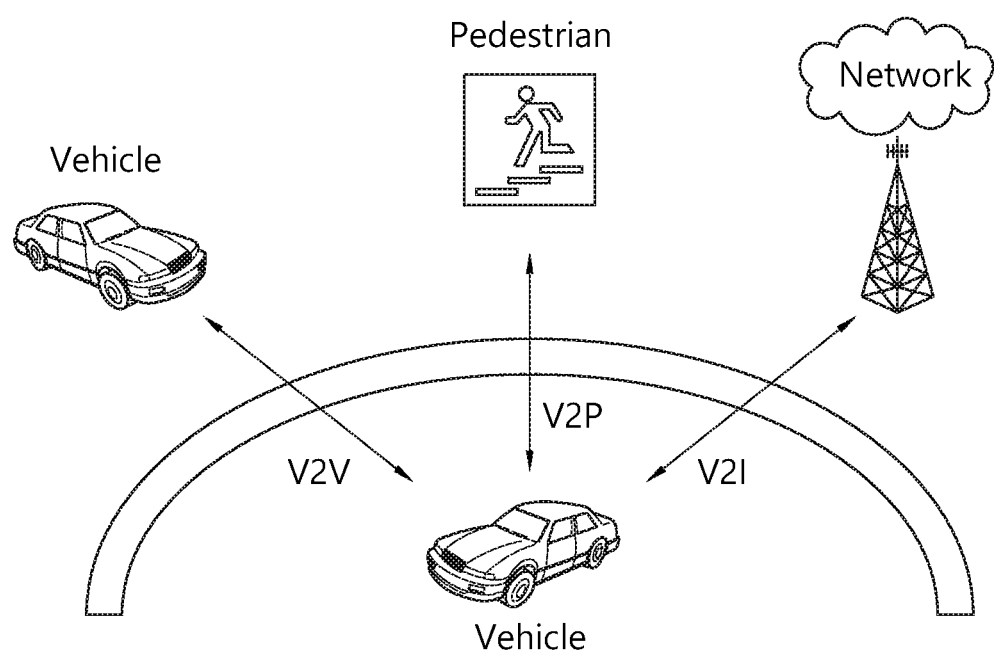
FIG. 5 is a diagram illustrating a V2X communication environment.

FIG. 5 is a diagram illustrating a V2X communication environment.

V2X is a technology that continuously communicates with a road infra or another vehicle while running a vehicle by adding mobility to D2D technology to exchange and share valuable information such as traffic situation. Researches and studies for supporting Vehicle-to-Vehicle (V2V) communication, Vehicle-to-Infrastructure (V2I) communication, Vehicle-to-Pedestrian (V2P) communication, Vehicle-to-Network (V2N) communication through evolution of connectivity function has been performed.

According to V2X communication, a vehicle continuously broadcasts a position, speed, and a direction of the vehicle. Peripheral vehicles receiving the broadcasted information recognize movement of peripheral vehicles to use accident prevention. That is, similar to a case where a person has a UE in the form of a smart phone or a smart watch, a UE of a specific form may be installed in each vehicle. In this case, a UE installed at a vehicle is a device for receiving a real communication service from a communication network. For example, the UE installed at the vehicle may access a base station in an E-UTRAN to receive a communication service.

Meanwhile, before describing a suggested V2X, a plurality of terms to be used in the specification is firstly defined.

RSU (Road Side Unit): The RSU is an entity for supporting V2I communication, and means an entity capable of performing transmission and reception to and from a UE using a V2I application. The RSU may be configured by a base station or a UE (particularly, stationary UE). The base station or the UE operating as the RSU collects information (e.g., traffic light information, traffic volume information, and the like) on traffic safety and/or information regarding movement of peripheral vehicles, and transmits information to other UEs being a communication target or receives information from other UEs.

V2I communication: V2I communication is a type of V2X communication. A UE and an RSU using the V2I application becomes a subject of the V2I communication.

V2N communication: V2N communication is a type of V2X communication. A UE and a serving entity using a V2N application becomes a subject of the V2N communication, and the UE and the serving entity communicate with each other through an LTE network entity.

V2P communication: V2P communication is a type of V2X communication. Two UE using a V2P application become a subject of the V2P communication.

V2V communication: V2V communication is a type of V2X communication. Two UE using a V2V application become a subject of the V2V communication. The difference of V2V communication from V2P communication is in that one UE becomes a UE of a pedestrian in the V2P communication, and one UE becomes a UE of a vehicle in the V2V communication.

Un interface: The Un interface means an interface between a relay node and a base station, which is an interface used in transmission/reception achieved in MBSFN (MBMS (Multimedia Broadcast/Multicast Services) over Single Frequency Network) subframe.

PC5 interface: The PC5 interface means an interface used in direct communication between two UEs, which is an interface used for communication between devices for supporting a Proximity Service (ProSe).

Figure 6:
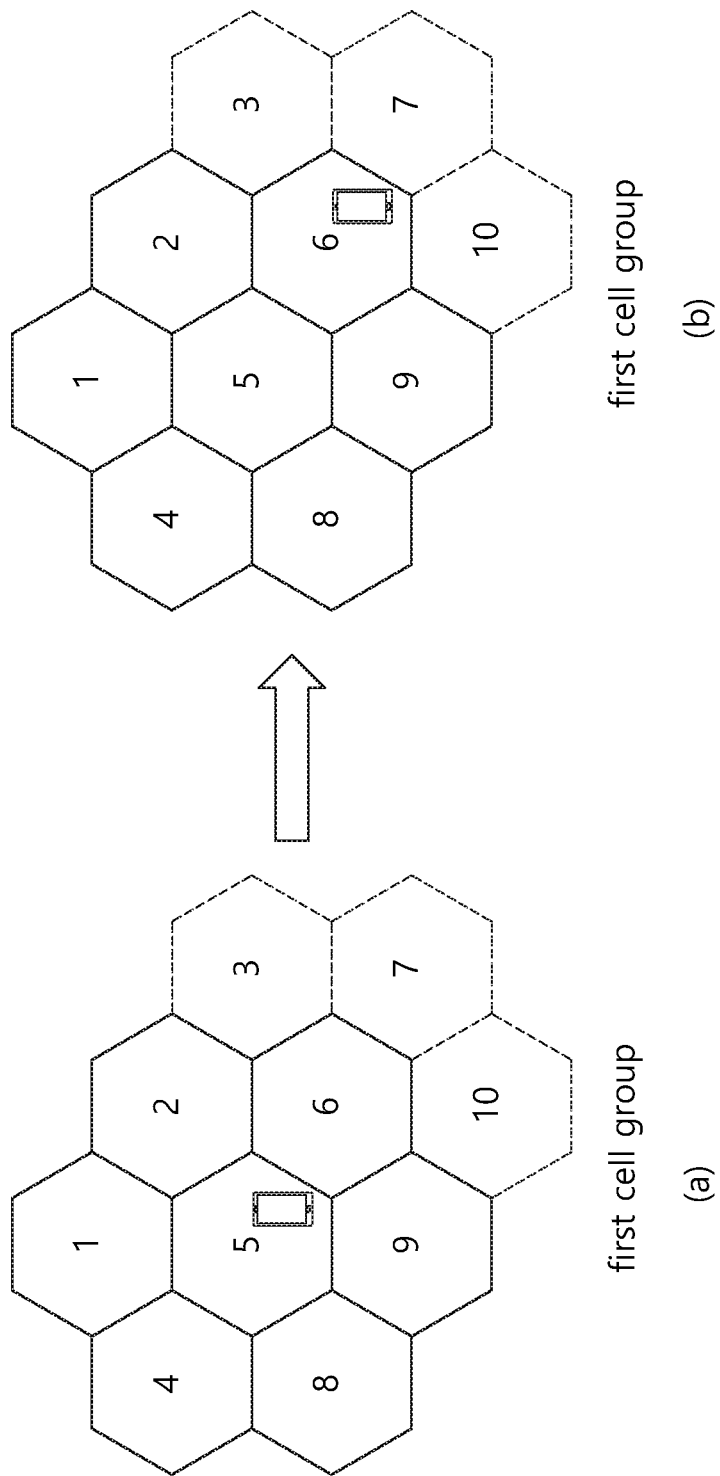
FIG. 6 shows a cell group for broadcasting a V2X message.

FIG. 6 shows a cell group for broadcasting a V2X message.

In order for a UE to transmit a V2X message to a plurality of UEs within a communication range of the UE, an eNB or an RSU may be used. In this case, a cell group to which the V2X message is to be transmitted may be defined. The cell group may be set by the OAM, and the set cell group may be provided to a related base station. When the cell group is set, a V2X message generated in any cell belonging to the cell group may be broadcast to all the cells that belong to the cell group.

In order to broadcast a V2X message generated in a certain cell belonging to a cell group to all the cells that belong to the cell group, an eMBMS system may be used. However, currently, there is no way for an MBMS related node (for example, MCE, MME, BM-SC, etc.) to know the cell group. If the MBMS related node does not know the information related to the cell group, the V2X message may be transmitted to a cell to which the V2X message does not need to be transmitted, and thus, signaling between the MBMS related nodes and radio resources for transmitting the V2X message may be unnecessary. This will be described in detail with reference to FIG. 6 hereinafter.

Referring to (a) of FIG. 6, a first cell group may be set to include cell 1, cell 2, cell 4, cell 5, cell 6, cell 8, and cell 9. Thus, if a V2X message is generated in the area of cell 5, the V2X message may be broadcast to all cells that belong to the first cell group.

Referring to (b) of FIG. 6, if a V2X message is generated in an area of the cell 6, the V2X message may be broadcast to all cells that belong to the first cell group. That is, although the V2X message is generated in the area of the cell 6, the V2X message may be transmitted to all the cells that belong to the first cell group. In this case, the V2X message generated in the area of the cell 6 may be transmitted to cell 1, cell 4 and cell 8, to which the V2X message does not need to be transmitted. Therefore, radio resources for transmitting the V2X message to the cell 1, cell 4, and cell 8 may be unnecessary. Further, although the V2X message needs to be transmitted to the cell 3, cell 7 and cell 10, it may not be transmitted to cell 3, cell 7 and cell 10.

In order to solve the above problem, the cell group to which the V2X message is to be transmitted needs to be changed. In addition, the cell group to which the V2X message is to be transmitted needs to be notified to a V2X server. Furthermore, the V2X message needs to be transmitted only to the cell group to which the V2X message is to be transmitted.

Hereinafter, a method of performing V2X communication based on cell group information and a device supporting the same according to an embodiment of the present invention will be described in detail.

Figure 7:
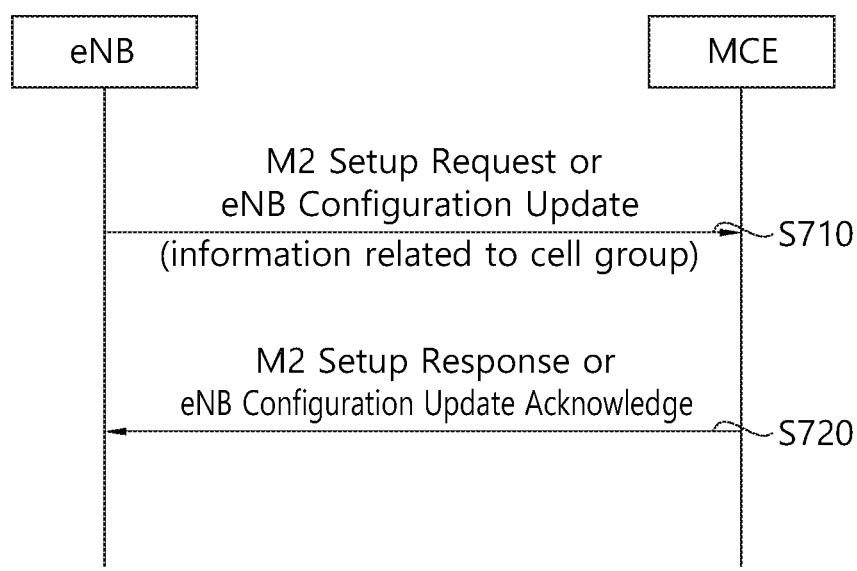
FIG. 7 shows a method of transmitting information related to a cell group by a base station (BS) (or eNB) according to an embodiment of the present invention.

FIG. 7 illustrates a method of transmitting information related to a cell group by a BS according to an embodiment of the present invention.

Referring to FIG. 7, in step S710, an eNB may transmit information related to a cell group to an MCE. The information related to the cell group may include an index of the cell group. Alternatively, the information related to the cell group may include a list of cell IDs. The cell group may be a set of cells to which a V2X message is to be transmitted.

Information related to the cell group may be included in an M2 setup request message and may be transmitted from the eNB to the MCE. That is, the information related to the cell group may be transmitted through an M2 setup procedure. Alternatively, the information related to the cell group may be included in an eNB configuration update message and may be transmitted from the eNB to the MCE. That is, the information related to the cell group may be transmitted through an eNB configuration update procedure. Alternatively, the information related to the cell group may be included in a new message and transmitted to the MCE from the eNB.

In step S720, when the MCE receives the information related to the cell group from the eNB, the MCE may store the information related to the cell group and transmit a response message to the eNB. The response message may be one of an M2 setup response message, an eNB configuration update acknowledge message, or a new message.

According to the proposed procedure, the information related to the cell group may be transmitted from the eNB to the MCE.

Figure 8:
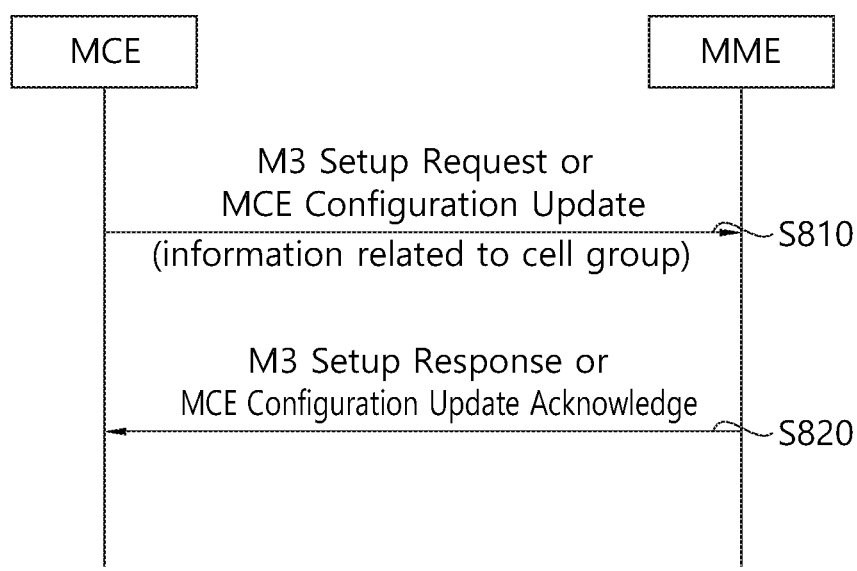
FIG. 8 illustrates a method of transmitting information related to a cell group by an MCE according to an embodiment of the present invention.

FIG. 8 illustrates a method of transmitting information related to a cell group by the MCE according to an embodiment of the present invention.

Referring to FIG. 8, in step S810, the MCE may transmit information related to a cell group to the MME. The information related to the cell group may include an index of the cell group. Alternatively, the information related to the cell group may include a list of cell IDs. The cell group may be a set of cells to which a V2X message is to be transmitted.

The information related to the cell group may be included in an M3 setup request message and may be transmitted from the MCE to the MME. That is, the information related to the cell group may be transmitted through the M3 setup procedure. Alternatively, the information related to the cell group may be included in an MCE configuration update message and transmitted from the MCE to the MME. That is, the information related to the cell group may be transmitted through an MCE configuration update procedure. Alternatively, the information related to the cell group may be included in a new message and transmitted to the MME from the MCE In step S820, when the MME receives the information related to the cell group from the MCE, the MME may store the information related to the cell group and transmit a response message to the MCE. The response message may be any one of an M3 setup response message, an MCE configuration update acknowledge message, and a new message.

According to the proposed procedure, the information related to the cell group may be transferred from the MCE to the MME. Then, the MME delivers the information related to the cell group to an MBMS-GW, the MBMS-GW transmits the information related to the cell group to a BM-SC, and the BM-SC may transmit the information related to the cell group to a V2X server. Therefore, the V2X server may know the information related to the cell group transmitted by the eNB. That is, the V2X server may know the cell group to which the V2X message is to be broadcast.

Figure 9:
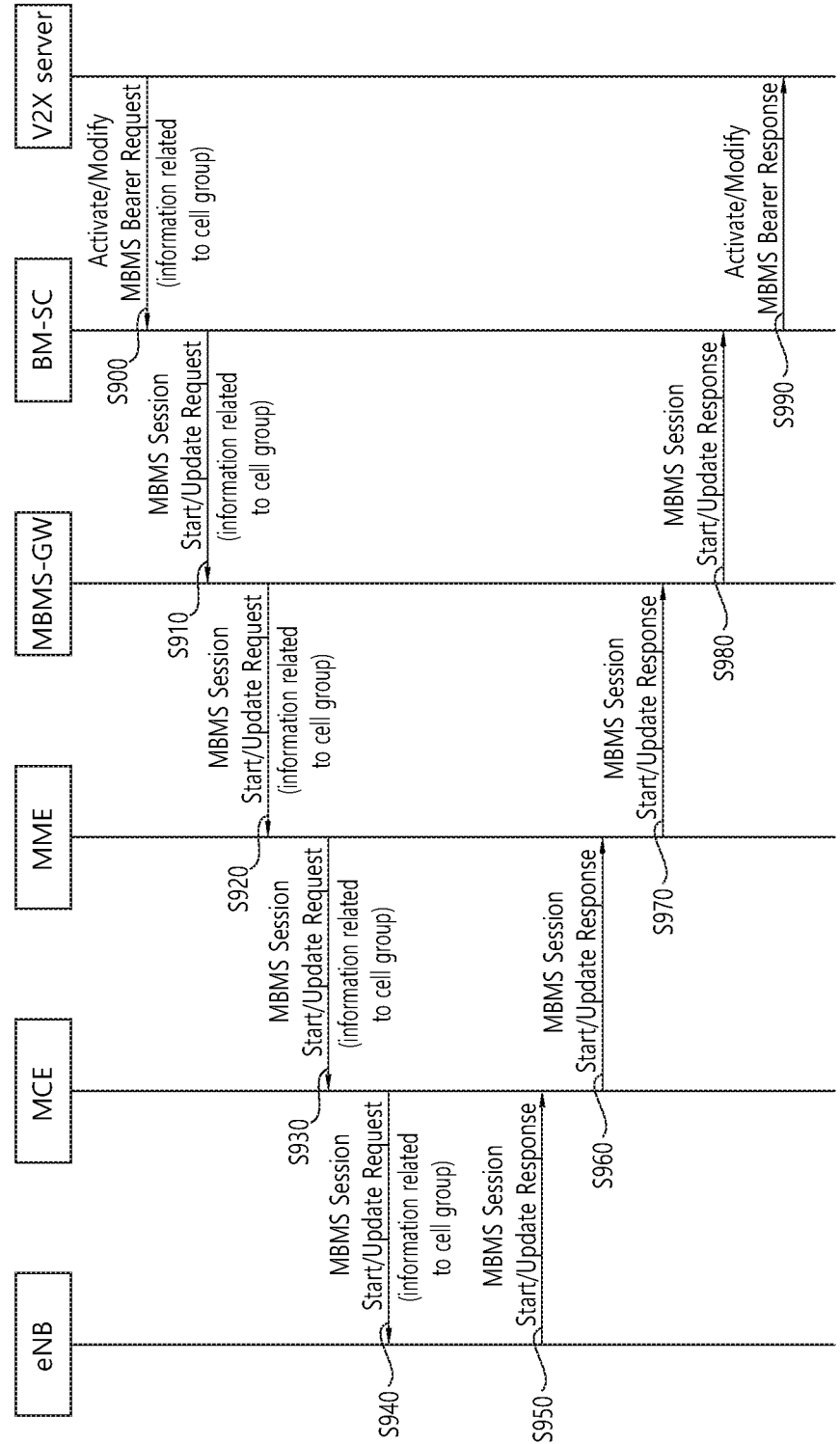
FIG. 9 illustrates a method of transmitting a V2X message to an involved eNB based on information related to a cell group according to an embodiment of the present invention.

FIG. 9 illustrates a method of transmitting a V2X message to a related eNB based on information related to a cell group according to an embodiment of the present invention.

The V2X server may provide information related to a cell group to which a V2X message is to be transmitted to the eNB through an MBMS control plane node. The information related to the cell group may include an index of the cell group. Alternatively, the information related to the cell group may include a list of cell IDs. The cell group may be a set of cells to which the V2X message is to be transmitted.

Referring to FIG. 9, in step S900, when a V2X message is received from a UE and a cell group to which the V2X message is to be transmitted is determined based on the V2X message, the V2X server may transmit an activate MBMS bearer request message including information related to the cell group to the BM-SC. The UE may be a UE mounted on a vehicle on the move.

Alternatively, in step S900, if the V2X message is received and the cell group to which the V2X message is to be transmitted needs to be changed, the V2X server may transmit a modify MBMS bearer request message including information related to the changed cell group to the BM-SC.

In step S910, when the BM-SC receives the activate MBMS bearer request message from the V2X server, the BM-SC may allocate an MBMS resource for supporting content delivery of an MBMS bearer to the requested cell group using an MBMS session start procedure. Accordingly, the BM-SC may transmit an MBMS session start request message including the received information related to the cell group to the MBMS-GW.

Alternatively, in step S910, when the BM-SC receives a modified MBMS bearer request message including the information related to the changed cell group from the V2X server, the BM-SC may transmit the received information related to the cell group to the MBMS-GW. The received information related to the cell group may be transmitted using an MBMS session update request message.

In step S920, when the MBMS-GW receives the MBMS session start request message from the BM-SC, the MBMS-GW may transmit the information related to the cell group to the MME. The received information related to the cell group may be transmitted using an MBMS session start request message.

Alternatively, in step S920, when the MBMS-GW receives the MBMS session update request message from the BM-SC, the MBMS-GW may transmit the received information related to the cell group to the MME. The received information related to the cell group may be transmitted using an MBMS session update request message.

In step S930, when the MME receives the MBMS session start request message from the MBMS-GW, the MME may transmit an MBMS session start request message including the received information related to the cell group to a relevant MCE based on the received information related to the cell group. The relevant MCE may be one MCE or a plurality of MCEs.

Alternatively, in step S930, when the MME receives an MBMS session update request message from the MBMS-GW, the MME may transmit an MBMS session update request message including the received information related to the cell group to the relevant MCE based on the received information related to the cell group. The relevant MCE may be one MCE or a plurality of MCEs.

In step S940, when the MCE receives the MBMS session start request message from the MME, the MCE may transmit the received information related to the cell group to an involved eNB based on the received information related to the cell group. The involved eNB may be one eNB or a plurality of eNBs. The received information related to the cell group may be transmitted using an MBMS session start request message.

Alternatively, in step S940, when the MCE receives the MBMS session update request message from the MME, the MCE may transmit the received information related to the cell group to the involved eNB based on the received information related to the cell group. The involved eNBs may be one eNB or a plurality of eNBs. The received information related to the cell group may be transmitted using an MBMS session update request message.

In step S950, when the eNB accepts an MBMS session start request message, the eNB may respond with an MBMS session start response message.

Alternatively, in step S950, when the eNB receives the MBMS session update request message, the eNB may update MBMS context and resources in response to the MBMS session update request message, and transmit an MBMS session update response message to the MCE.

In step S960, the MCE may report a result of a requested MBMS E-RAB (E-UTRAN radio access bearer) to the MME. The report may be performed using an MBMS session start response message.

Alternatively, in step S960, when the MCE receives the MBMS session update response message from one or a plurality of involved eNBs, the MCE may report the update result to the MME. The report may be performed using an MBMS session update response message.

In step S970, when the MME receives an MBMS session start response message from the MCE, the MME may transmit an MBMS session start response message to the MBMS-GW according to the received message.

Alternatively, in step S970, when the MME receives an MBMS session update response message from the MCE, the MME may transmit an MBMS session update response message to the MBMS-GW according to the received message.

In step S980, when the MBMS-GW receives the MBMS session start response message from the MME, the MBMS-GW may transmit the MBMS session start response message to the BM-SC according to the received message.

Alternatively, in step S980, when the MBMS-GW receives the MBMS session update response message from the MME, the MBMS-GW may transmit an MBMS session update response message to the BM-SC according to the received message.

In step S990, when the BM-SC receives the session start response message from the MBMS-GW, the BM-SC may transmit an activate MBMS bearer response message to the V2X server.

Alternatively, in step S990, when the BM-SC receives the session update response message from the MBMS-GW, the BM-SC may transmit a modify MBMS bearer response message to the V2X server.

According to the proposed procedure, since the information related to the cell group is known to MBMS related nodes, the V2X message may be transmitted only to the cell group.

According to the procedure proposed in this disclosure, the eNB may notify the V2X server of a cell group to which the V2X message needs to be transmitted, and the V2X server may transmit the V2X message only to the cell group to which the V2X message needs to be transmitted.

Figure 10:
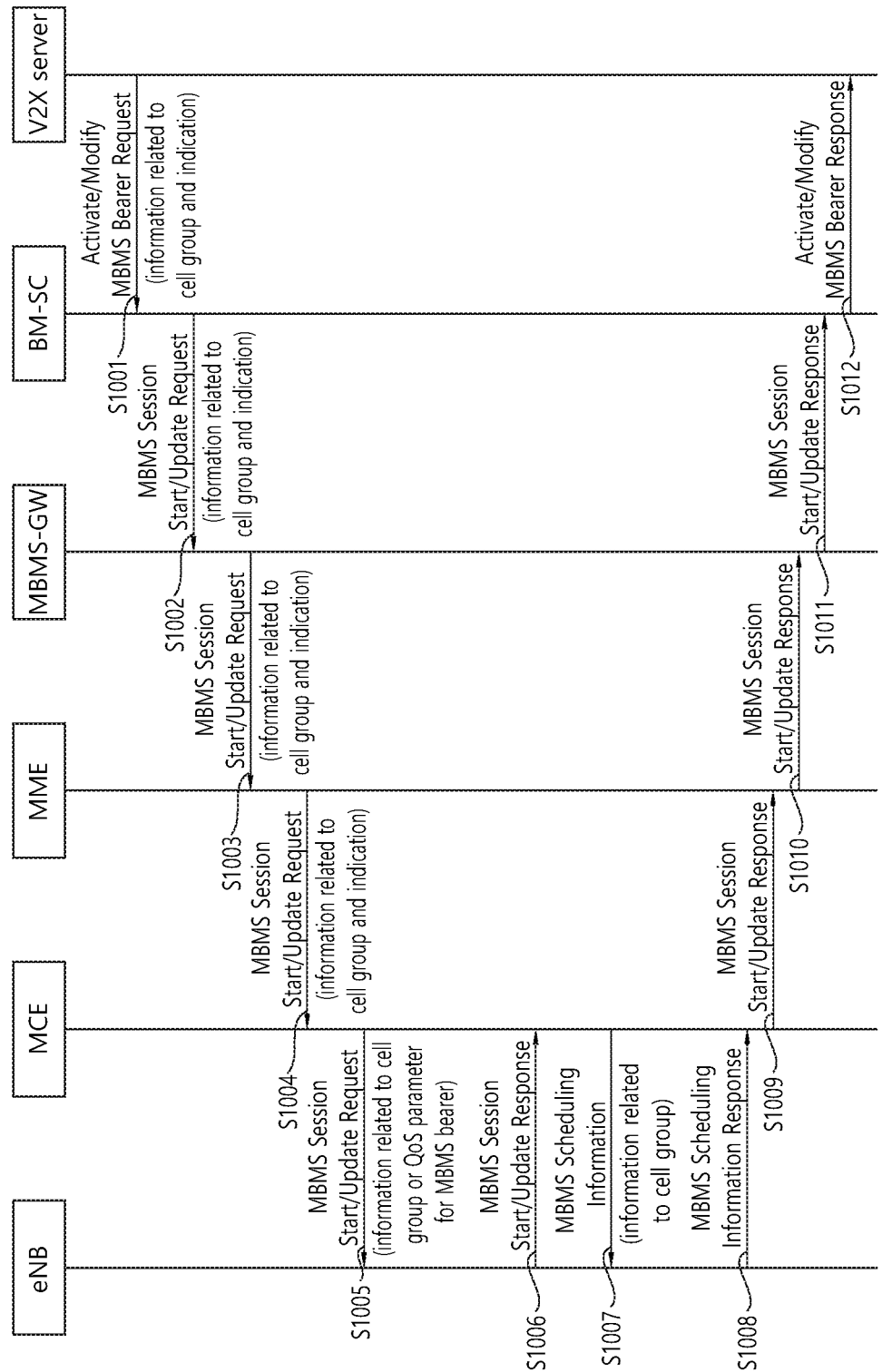
FIG. 10 illustrates a method of transmitting a V2X message to an involved eNB based on information related to a cell group and an indication according to an embodiment of the present invention.

FIG. 10 illustrates a method of transmitting a V2X message to an involved eNB based on information related to a cell group and an indication according to an embodiment of the present invention.

The V2X server may provide the eNB with information related to a cell group to which a V2X message is to be transmitted to the eNB through an MBMS control plane node, and an indication. The indication may indicate whether the MCE must perform an MBSFN operation or the SCPTM operation. The information related to the cell group may include an index of the cell group. Alternatively, the information related to the cell group may include a list of cell IDs. Alternatively, the information related to the cell group may be an MBMS service area. Alternatively, the information related to the cell group may be a cell list for SCPTM.

Referring to FIG. 10, in step S1001, when a V2X message is received from a UE and a cell group to which the V2X message is to be transmitted is determined based on the V2X message, the V2X server may transmit an activate MBMS bearer request message including information related to the cell group and an indication to the BM-SC. The indication may indicate whether the MCE must perform the MBSFN operation or the SCPTM operation. Regardless of the information related to the cell group included in the activate MBMS bearer request message, the indication may indicate which of an MBSFN operation or an SCPTM operation is to be performed by the MCE. For example, even when the information related to the cell group included in the activate MBMS bearer request message is a cell list for SCPTM, the indication may indicate that the MCE must perform the MBSFN operation. For example, even when the information related to the cell group included in the active MBMS bearer request message is an MBMS service area, the indication may instruct the MCE to perform an SCPTM operation. The UE may be a UE mounted in a vehicle on the move.

Alternatively, in step S1001, when the V2X message is received and the cell group to which the V2X message is to be transmitted needs to be changed, the V2X server may transmit a modified MBMS bearer request message including information related to a changed cell group and an indication to the BM-SC. The indication may indicate whether the MCE must perform an MBSFN operation or a SCPTM operation. Regardless of the information related to the cell group included in the modified MBMS bearer request message, the indication may indicate whether the MCE must perform either the MBSFN operation or the SCPTM operation. For example, even when the information related to the cell group included in the modified MBMS bearer request message is a cell list for SCPTM, the indication may instruct the MCE to perform MBSFN operation. For example, even when the information related to the cell group included in the modified MBMS bearer request message is an MBMS service area, the indication may instruct the MCE to perform the SCPTM operation.

In step S1002, when the BM-SC receives an activate MBMS bearer request message from the V2X server, the BM-SC may allocate MBMS resources for supporting content delivery of an MBMS bearer to the requested cell group using an MBMS session start procedure. Accordingly, the BM-SC may transmit an MBMS session start request message including the received information related to the cell group and the indication received from the V2X server to the MBMS-GW. Regardless of the received information related to the cell group, an indication for instructing the MCE to perform either the MBSFN operation or the SCPTM operation may be transmitted through an MBMS session start request message. For example, even when the information related to the cell group is a cell list for SCPTM, the indication for instructing the MCE to perform the MBSFN operation may be transmitted through the MBMS session start request message. For example, even when the information related to the cell group is an MBMS service area, the indication for instructing the MCE to perform the SCPTM operation may be transmitted through the MBMS session start request message.

Alternatively, in step S1002, when the BM-SC receives, from the V2X server, the modified MBMS bearer request message including the information related to the changed cell group and the indication received from the V2X server, the BM-SC may transmit the received information related to the cell group and the received indication to the MBMS-GW. The received information related to the cell group and the received indication may be transmitted using an MBMS session update request message. Regardless of the received information related to the cell group, the indication for instructing the MCE to perform either the MBSFN operation or the SCPTM operation may be transmitted through the MBMS session update request message. For example, even when the information related to the cell group is a cell list for the SCPTM, the indication for instructing the MCE to perform the MBSFN operation may be transmitted through the MBMS session update request message. For example, even when the information related to the cell group is an MBMS service area, the indication for instructing the MCE to perform the SCPTM operation may be transmitted through the MBMS session update request message.

In step S1003, when the MBMS-GW receives an MBMS session start request message from the BM-SC, the MBMS-GW may transmit the received information related to the cell group and the received indication to the MME using the MBMS session start request message. Alternatively, in step S1003, when the MBMS-GW receives the MBMS session update request message from the BM-SC, the MBMS-GW may transmit the received information related to the cell group and the received indication to the MME using the MBMS session update request message.

Regardless of the received information related to the cell group, the indication for instructing the MCE to perform either the MBSFN operation or the SCPTM operation may be transmitted using the MBMS session start request message or the MBMS session update request message. For example, even when the information related to the cell group is a cell list for SCPTM, the indication for instructing the MCE to perform the MBSFN operation may be transmitted using the MBMS session start request message or the MBMS session update request message. For example, even when the information related to the cell group is the MBMS service area, the indication for instructing the MCE to perform the SCPTM operation may be transmitted using the MBMS session start request message or the MBMS session update request message.

In step S1004, when the MME receives the MBMS session start request message from the MBMS-GW, the MME may transmit an MBMS session start request message including the received information related to the cell group to a relevant MCE based on the received information related to the cell group. The relevant MCE may be one MCE or a plurality of MCEs. Alternatively, in step S1004, when the MME receives an MBMS session update request message from the MBMS-GW, the MME may transmit an MBMS session update request message including the received information related to the cell group and the received indication to the relevant MCE based on the received information related to the cell group. The relevant MCE may be one MCE or a plurality of MCEs.

Regardless of the received information related to the cell group, the indication for instructing the MCE to perform either the MBSFN operation or the SCPTM operation may be transmitted using the MBMS session start request message or the MBMS session update request message. For example, even when the information related to the cell group is a cell list for SCPTM, the indication for instructing the MCE to perform the MBSFN operation may be transmitted using the MBMS session start request message or the MBMS session update request message. For example, even when the information related to the cell group is the MBMS service area, the indication for instructing the MCE to perform the SCPTM operation may be transmitted using the MBMS session start request message or the MBMS session update request message.

In step S1005, when the MCE receives the MBMS session start request message or the MBMS session update request message from the MME, the MCE may determine whether to perform the MBSFN operation or the SCPTM operation based on the received indication. The MCE may operate as follows according to the information related to the cell group and the indication.

(1) Case where the indictor instructs the MCE to perform the MBSFN operation but the information related to the cell group is an index of a cell group, a list of cell IDs, or a cell list for SCPTM The MCE may perform the MBSFN operation based on the indication. based on the received index of the cell group, the list of cell IDs or the cell list for SCPTM, the MCE may transmit the received index of the cell group, the list of cell IDs or the cell list for SCPTM to the involved base eNB. The involved eNBs may be one eNB or a plurality of eNBs. The received index of the cell group, the list of cell IDs, or the cell list for SCPTM may be transmitted using the MBMS session start request message or the MBMS session update request message. In this case, the indication indicating the MCE to perform the MBSFN operation may additionally be transmitted to the involved eNB.

(2) Case where the indication instructs the MCE to perform the SCPTM operation but the information related to the cell group is an index of a cell group, a list of cell IDs, or an MBMS service area The MCE may perform the SCPTM operation based on the indication, based on the received index of the cell group, the list of cell IDs, or the MBMS service area, the MCE may transmit the received index of the cell group, the list of cell IDs, or the MBMS service area to the involved eNB. In this case, a QoS parameter for the MBMS bearer may be additionally transmitted to the involved eNB. For example, the QoS parameter for the MBMS bearer may be an MBMS E-RAB QoS parameter. The involved eNBs may be one eNB or a plurality of eNBs. The received MBMS service area may be transmitted using the MBMS session start request message or the MBMS session update request message.

In the case of the SCPTM operation, each eNB must allocate resources by itself. However, since the index of the cell group, the list of the cell IDs, or the MBMS service area do not include the QoS parameter information, the MCE must transmit the QoS parameter for the MBMS bearer together with the index of the cell group, the list of the cell IDs, and the MBMS service area.

In step S1006, when the eNB accepts an MBMS session start request message, the eNB may respond with an MBMS session start response message. Alternatively, in step S1006, when the eNB receives the MBMS session update request message, the eNB may update the MBMS context and resources and transmit an MBMS session update response message to the MCE, in response to the MBMS session update request message.

In the case of the SCPTM operation, when the eNB receives the QoS parameter for the MBMS bearer together with the index of the cell group, the list of the cell IDs, or the MBMS service area from the MCE, the eNB may use the QoS parameter for the MBMS bearer, for the SCPTM operation. For example, the eNB may allocate resources for the MBMS service related to a related cell using the QoS parameter for the MBMS bearer.

In the case of the MBSFN operation, when the eNB receives the received index of the cell group or the list of the cell IDs from the MCE, the eNB may know that the MBSFN operation must be performed. Alternatively, when the eNB additionally receives the cell list for the SCPTM and the indication for instructing the MCE to perform the MBSFN operation, the eNB may know that the MBSFN operation must be performed. Hereinafter, steps S1007 and S1008 may be applied only when the MBSFN operation is performed.

In step S1007, when the MCE receives the MBMS session start response message or the MBMS session update response message from the eNB, the MCE may transmit an MBMS scheduling information message including the received index of the cell group, the list of cell IDs, or a cell list for SCPTM, to eNB. The MBMS scheduling information message may be transmitted to distinguish it from a previously established MBMS session.

In step S1008, when the eNB receives the MBMS scheduling information message from the MCE, the eNB may acknowledge reception of the MBMS scheduling information message and transmit an MBMS scheduling information response message to the MCE.

In step S1009, the MCE may report the result of the requested MBMS E-RAB (E-UTRAN radio access bearer) to the MME. The report may be performed using an MBMS session start response message.

Alternatively, in step S1009, when the MCE receives the MBMS session update response message from one or more involved eNBs, the MCE may report the update result to the MME. The report may be performed using an MBMS session update response message.

In step S1010, when the MME receives the MBMS session start response message from the MCE, the MME may transmit an MBMS session start response message to the MBMS-GW according to the received message.

Alternatively, in step S1010, when the MME receives an MBMS session update response message from the MCE, the MME may transmit the MBMS session update response message to the MBMS-GW according to the received message.

In step S1011, when the MBMS-GW receives the MBMS session start response message from the MME, the MBMS-GW may transmit the MBMS session start response message to the BM-SC according to the received message.

Alternatively, in step S1011, when the MBMS-GW receives the MBMS session update response message from the MME, the MBMS-GW may transmit the MBMS session update response message to the BM-SC according to the received message.

In step S1012, when the BM-SC receives the session start response message from the MBMS-GW, the BM-SC may transmit an activate MBMS bearer response message to the V2X server.

Alternatively, in step S1012, when the BM-SC receives the session update response message from the MBMS-GW, the BM-SC may transmit a modify MBMS bearer response message to the V2X server.

According to the proposed procedure, a V2X message may be transmitted to the involved eNBs via either the MBSFN operation or the SCPTM operation, based on the indication for instructing the MCE to perform either the MBSFN operation or the SCPTM operation.

Figure 11:
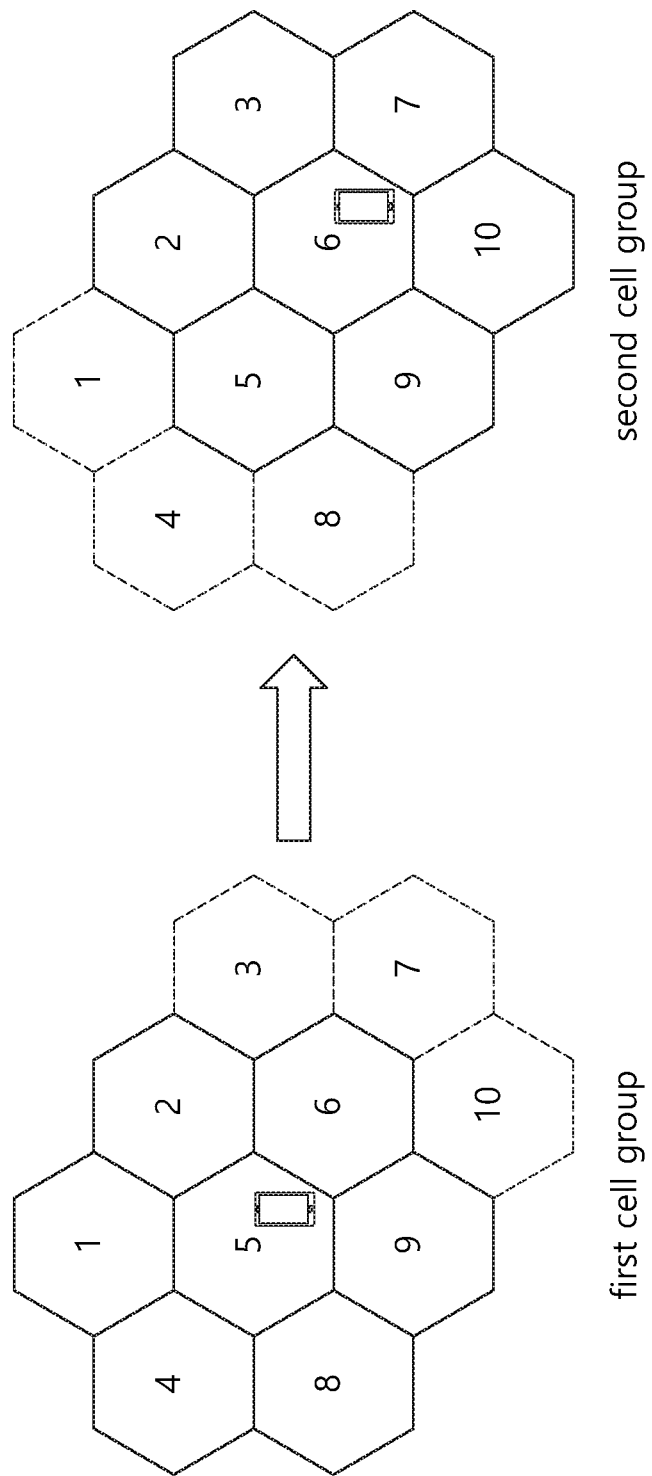
FIG. 11 illustrates cell groups for broadcasting a V2X message according to an embodiment of the present invention.

FIG. 11 shows a group of cells for broadcasting a V2X message according to an embodiment of the present invention.

Referring to FIG. 11, it is assumed that a first cell group includes cell 1, cell 2, cell 4, cell 5, cell 6, cell 8, and cell 9. Hereinafter, it is assumed that a mobile UE moves from cell 5 to cell 6. It is also assumed that a specific event (e.g., a vehicle accident) occurs at the UE located in cell 6. According to an embodiment of the present invention, the cell 6 (or the eNB managing the cell 6) may transmit information related to a new second cell group to the V2X server, and the V2X server may broadcast a V2X message based on information related to the new second cell group. Thus, the V2X message generated in the cell 6 may be transferred to the cell 6 and the neighbor cells (i.e., cell 2, cell 3, cell 5, cell 7, cell 9, and cell 10) of the cell 6. Therefore, according to an embodiment of the present invention, an MBMS-related node (e.g., MCE, MME, BM-SC, etc.) may know information related to a cell group, and thus, unnecessary signaling between MBMS-related nodes and unnecessary use of radio resources for transmitting the V2X message may be reduced. For the purposes of description, it is assumed that the cell group includes the cell in which the V2X message is generated and the neighbor cell of the cell in which the V2X message is generated. However, the cell group may be configured in various forms and is not limited to the embodiment of FIG. 11.

Figure 12:
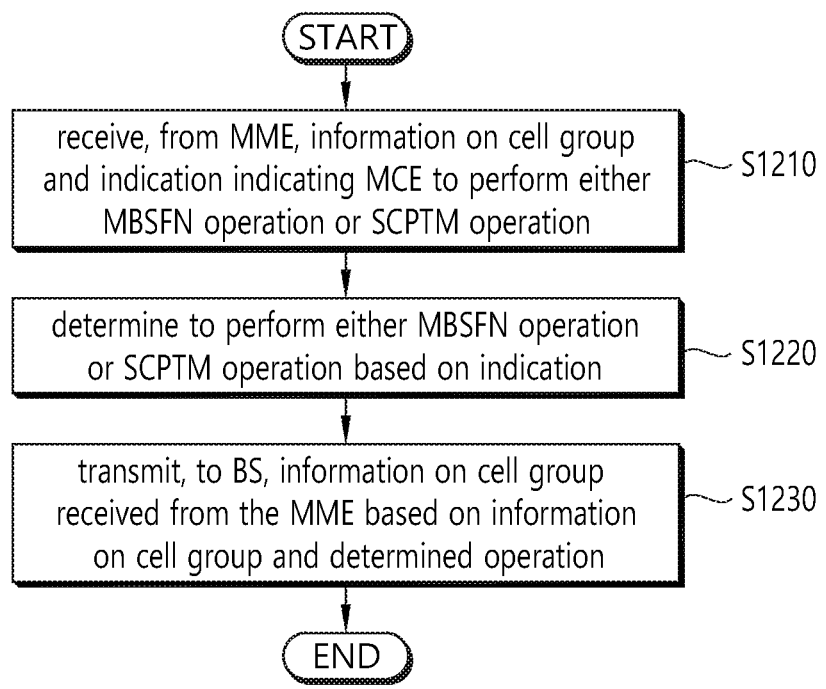
FIG. 12 is a flowchart illustrating a method of performing V2X communication based on an indication by an MCE according to an embodiment of the present invention.

FIG. 12 is a flowchart illustrating a method of performing V2X communication based on an indication by the MCE according to an embodiment of the present invention.

Referring to FIG. 12, in step S1210, the MCE may receive, from the MME, information on a cell group and an indication indicating the MCE to perform either the MBSFN operation or the SCPTM operation.

In step S1220, the MCE may determine to perform either the MBSFN operation or the SCPTM operation based on the indication.

In step S1230, based on the information on the cell group and the determined operation, the MCE may transmit, to the eNB, the information on the cell group received from the MME. The information on the cell group may be information related to a cell group to which the V2X message is to be transmitted, and the eNB may be an eNB managing a cell belonging to a cell group to which the V2X message is to be transmitted.

When the MCE determines to perform the SCPTM operation, the MCE may further transmit QoS parameters for the MBMS bearer to the eNB. The information related to the cell group may include at least one of an index of the cell group, a list of cell IDs, and an MBMS service area.

When the MCE determines to perform the MBSFN operation, the MCE may transmit an MBMS scheduling information message including information on the cell group to the eNB.

Figure 13:
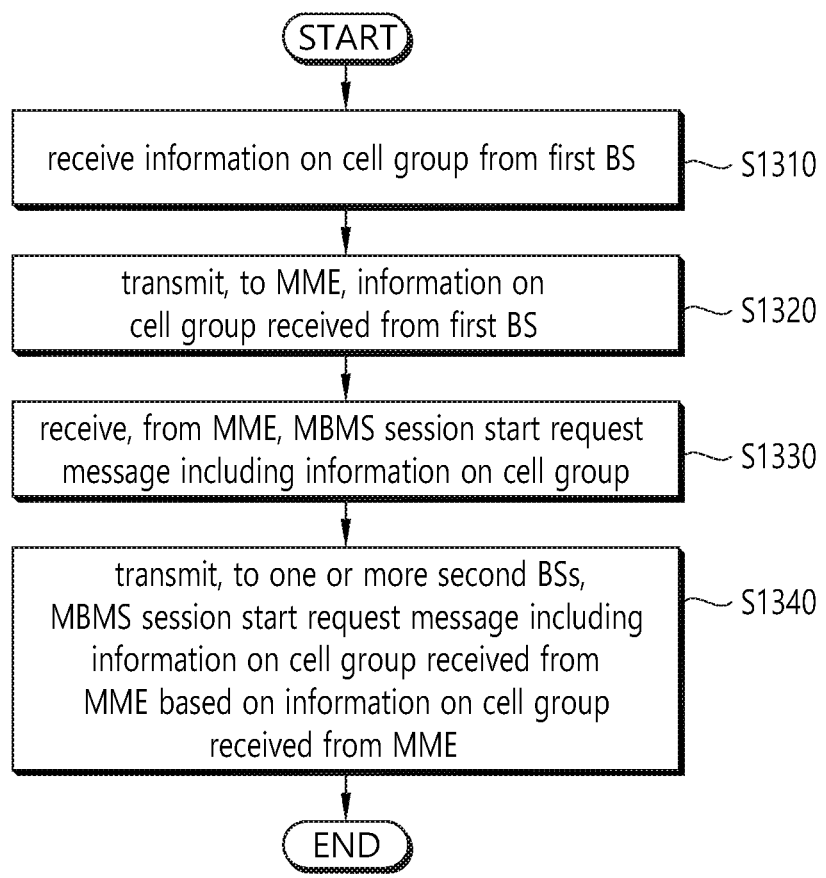
FIG. 13 is a flowchart illustrating a method of performing V2X communication by an MCE according to an embodiment of the present invention.

FIG. 13 is a flowchart illustrating a method of performing V2X communication by the MCE according to an embodiment of the present invention.

Referring to FIG. 13, in step S1310, the MCE may receive information on a cell group from a first eNB. The information on the cell group received from the first eNB may be included in an M2 setup request message and received from the first BS. Alternatively, the information on the cell group received from the first eNB may be included in an eNB configuration update message and received from the first eNB.

In step S1320, the MCE may transmit, to the MME, the information on the cell group received from the first eNB. The information on the cell group transmitted to the MME may be included in an M3 setup request message and transmitted to the MME. Alternatively, the information on the cell group transmitted to the MME may be included in an MCE configuration update message and transmitted to the MME.

In step S1330, the MCE may receive, from the MME, an MBMS session start request message including the information on the cell group. Alternatively, the MCE may receive an MBMS session update request message including the information on the cell group from the MME.

In step S1340, the MCE may transmit, to one or more second eNBs, an MBMS session start request message including the information on the cell group received from the MME based on the information on the cell group received from the MME. Alternatively, the MCE may transmit, to one or more second eNBs, an MBMS session update request message including the information on the cell group received from the MME based on the information on the cell group received from the MME.

The information on the cell group may be information related to a cell group to which a V2X message generated in a cell managed by the first eNB is to be transferred. The second eNB may be an eNB managing a cell belonging to a cell group to which the V2X message generated in a cell managed by the first eNB is to be transferred.

The at least one second eNB may include the first eNB. The at least one second eNB may include the first eNB and a neighbor eNB of the first eNB.

The information on the cell group may include an index of the cell group to which the V2X message generated in the cell managed by the first eNB is to be transferred. The information on the cell group may include a list of IDs of cells to which the V2X message generated in the cell managed by the first eNB is to be transferred.

Thereafter, when the MBMS session start request message is accepted by the second eNB, the MCE may receive an MBMS session start response message from the second eNB. The MCE may transmit an MBMS session start response message including the result of the requested MBMS E-RAB (E-UTRAN radio access bearer) to the MME.

Figure 14:
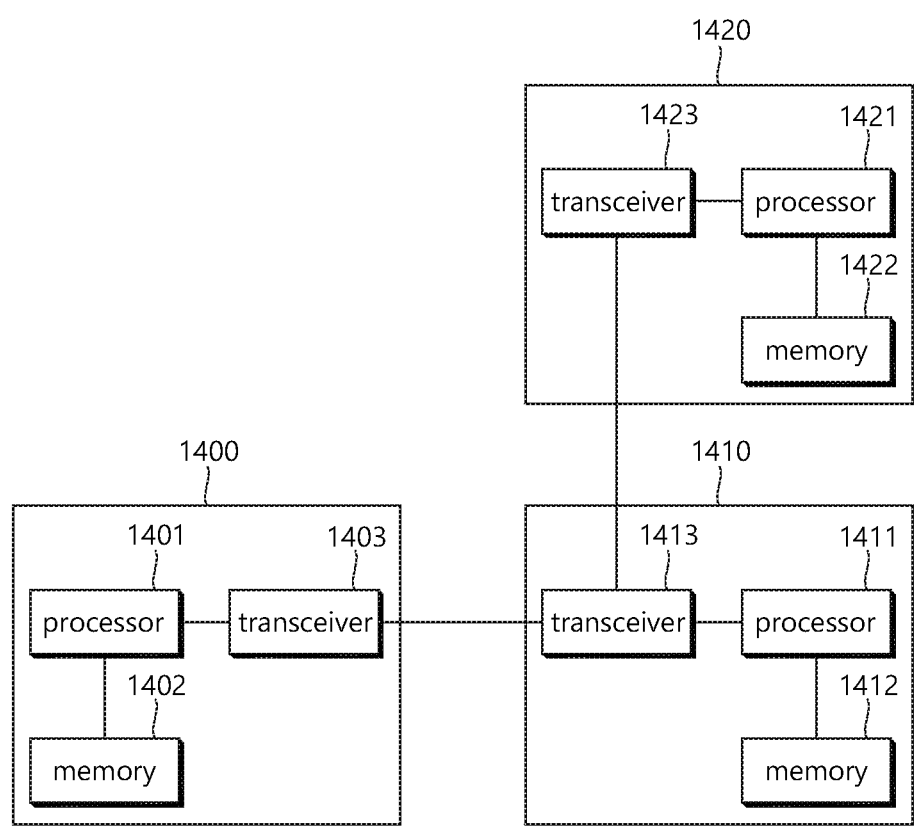
FIG. 14 is a block diagram illustrating a wireless communication system according to the embodiment of the present invention.

FIG. 14 is a block diagram illustrating a wireless communication system according to the embodiment of the present invention.

A BS 1400 includes a processor 1401, a memory 1402, and a transceiver 1403. The memory 1402 is connected to the processor 1401, and stores various information for driving the processor 1401. The transceiver 1403 is connected to the processor 1401, and transmits and/or receives radio signals. The processor 1401 implements proposed functions, processes and/or methods. In the above embodiment, an operation of the BS may be implemented by the processor 1401.

An MCE 1410 includes a processor 1411, a memory 1412, and a transceiver 1413. The memory 1412 is connected to the processor 1411, and stores various information for driving the processor 1411. The transceiver 1413 is connected to the processor 1411, and transmits and/or receives radio signals. The processor 1411 implements proposed functions, processes and/or methods. In the above embodiment, an operation of the MCE may be implemented by the processor 1411.

An MME 1420 includes a processor 1421, a memory 1422, and a transceiver 1423. The memory 1422 is connected to the processor 1421, and stores various information for driving the processor 1421. The transceiver 1423 is connected to the processor 1421, and transmits and/or receives radio signals. The processor 1421 implements proposed functions, processes and/or methods. In the above embodiment, an operation of the MME may be implemented by the processor 1421.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods may be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods on the basis of the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block may be implemented in a different order, or may be performed simultaneously with other steps or blocks. In addition, those ordinarily skilled in the art may know that the invention is not limited to each of the steps or blocks, and at least one different step may be added or deleted without departing from the scope and spirit of the invention.

The aforementioned embodiment includes various examples. It should be noted that those ordinarily skilled in the art know that all possible combinations of examples cannot be explained, and also know that various combinations may be derived from the technique of the present specification. Therefore, the protection scope of the invention should be determined by combining various examples described in the detailed explanation, without departing from the scope of the following claims.

What is claimed is:

1. A method for performing vehicle-to-everything (V2X) communication by a multi-cell coordination entity (MCE) in a wireless communication system, the method comprising:
receiving information on a cell group from a first base station (BS);
transmitting the information on the cell group received from the first BS to a mobility management entity (MME);
receiving an MBMS session start request message including the information on the cell group from the MME; and
transmitting the MBMS session start request message including the information on the cell group received from the MME to one or more second BSs based on the information on the cell group received from the MME,
wherein the information on the cell group is information related to a cell group to which a V2X message generated in a cell managed by the first BS is to be transferred, and
wherein the second BS is a BS that manages a cell belonging to the cell group to which the V2X message generated in the cell managed by the first BS is to be transferred.

2. The method of claim 1, wherein the information on the cell group includes an index of the cell group to which the V2X message generated in the cell managed by the first BS is to be transferred.

3. The method of claim 1, wherein the information on the cell group includes a list of an ID of a cell to which the V2X message generated in the cell managed by the first BS is to be transferred.

4. The method of claim 1, wherein the one or more second BSs include the first BS.

5. The method of claim 1, wherein the one or more second BSs include the first BS and a neighbor BS of the first BS.

6. The method of claim 1, further comprising:
based on the MBMS session start request message being accepted by the second BS, receiving an MBMS session start response message from the second BS.

7. The method of claim 6, further comprising:
transmitting an MBMS session start response message including a requested result of an MBMS E-UTRAN radio access bearer (E-RAB) to the MME.

8. A method for performing vehicle-to-everything (V2X) communication by a multi-cell coordination entity (MCE) in a wireless communication system, the method comprising:
receiving information on a cell group from a first base station (BS);
transmitting the information on the cell group received from the first BS to a mobility management entity (MME);
receiving an MBMS session update request message including the information on the cell group from the MME; and
transmitting the MBMS session update request message including the information on the cell group received from the MME to one or more second BSs based on the information on the cell group received from the MME,
wherein the information on the cell group is information related to a cell group to which a V2X message generated in a cell managed by the first BS is to be transferred, and
wherein the second BS is a BS that manages a cell belonging to the cell group to which the V2X message generated in the cell managed by the first BS is to be transferred.

9. The method of claim 8, wherein the information on the cell group includes an index of the cell group to which the V2X message generated in the cell managed by the first BS is to be transferred.

10. The method of claim 8, wherein the information on the cell group includes a list of an ID of a cell to which the V2X message generated in the cell managed by the first BS is to be transferred.

11. The method of claim 8, wherein the one or more second BSs include the first BS.

12. A multi-cell coordination entity (MCE) for performing vehicle-to-everything (V2X) communication, the MCE comprising:
one or more memories storing instructions;
one or more transceivers; and
one or more processors connected to the one or more memories and the one or more transceivers, wherein the one or more processors execute the instructions to:
receive information on a cell group from a first base station (BS);
transmit the information on the cell group received from the first BS to a mobility management entity (MME);
receive an MBMS session start request message including the information on the cell group from the MME; and
transmit the MBMS session start request message including the information on the cell group received from the MME to one or more second BSs based on the information on the cell group received from the MME,
wherein the information on the cell group is information related to a cell group to which a V2X message generated in a cell managed by the first BS is to be transferred, and
wherein the second BS is a BS that manages a cell belonging to the cell group to which the V2X message generated in the cell managed by the first BS is to be transferred.

* * * * *